United States Patent
Gibbon et al.

(10) Patent No.: US 8,060,373 B2
(45) Date of Patent: Nov. 15, 2011

(54) SYSTEM AND METHOD OF IDENTIFYING CONTACT INFORMATION

(75) Inventors: David C. Gibbon, Lincroft, NJ (US); Behzad Shahraray, Freehold, NJ (US); Zhu Liu, Marlboro, NJ (US); Lee Begeja, Gillette, NJ (US); Bernard S. Renger, New Providence, NJ (US); Gerald Michael Karam, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1273 days.

(21) Appl. No.: 11/726,379

(22) Filed: Mar. 21, 2007

(65) Prior Publication Data

US 2008/0235012 A1    Sep. 25, 2008

(51) Int. Cl.
  *G10L 15/00*  (2006.01)
  *G10L 11/00*  (2006.01)
(52) U.S. Cl. ........................... 704/275; 704/231
(58) Field of Classification Search .................. None
  See application file for complete search history.

(56) References Cited

U.S. PATENT DOCUMENTS

| | | | |
|---|---|---|---|
| 6,477,508 B1 | 11/2002 | Lazar et al. | |
| 7,539,730 B2 * | 5/2009 | Adams et al. | 709/206 |
| 2006/0088145 A1 | 4/2006 | Reed et al. | |
| 2006/0100980 A1 | 5/2006 | Reed et al. | |
| 2008/0059522 A1 * | 3/2008 | Li et al. | 707/104.1 |

OTHER PUBLICATIONS

Shim et al., 'Automatic Text Extraction From Video for Content-Based Annotation and Retrieval', IBM Research Report, Jan. 29, 1998.*
Doërr et al., 'A guide tour of video watermarking' Signal Processing: Image Communication 18, 2003, pp. 263-282.*
Jung et al., 'Text information extraction in images and video: a survey', Pattern Recognition 37, 2004, pp. 977-997.*
Chris Kunicki, "What's New with Smart Tags in Office 2003," www.msdn2.microsoft.com, Jan. 2, 2003, 7 pgs.
"About smart tags," www.office.microsoft.com, 3 pgs, 2007.
"Complete tasks quickly with Smart Tags in Office XP," www.office.microsoft.com, 5 pgs, 2007.
"AutoLink," www.wikipedia.org, 2 pgs, 2006.
"EIA-608," www.wikipedia.org, 3 pgs, 2006
Sarkis Abrahamian, "EIA-608 and EIA-708 Closed Captioning," 4 pgs, 2006.

* cited by examiner

*Primary Examiner* — Justin Rider
(74) *Attorney, Agent, or Firm* — Toler Law Group (57) ABSTRACT

A system and method for identifying contact information is provided. A system to identify contact information may include an input to receive a data stream. The data stream may include audio content, video content or both. The system may also include an analysis module to detect contact information within the data stream. The system may also include a memory to store a record of the contact information.

13 Claims, 8 Drawing Sheets

//<br>
SYSTEM AND METHOD OF IDENTIFYING CONTACT INFORMATION

FIELD OF THE DISCLOSURE

The present disclosure is generally related to systems and methods of identifying contact information.

BACKGROUND

Advertisers and others may provide contact information to users via audio or video media, such as television and radio. The contact information may be intended to provide audience members with a method of contacting an advertiser, for example. In some circumstances, it may be difficult for audience members to remember or write down the contact information. Hence, there is a need for an improved system and method of identifying contact information.

DETAILED DESCRIPTION OF THE DRAWINGS

In a particular embodiment, a system to identify contact information may include an input to receive a data stream including audio content. The system may also include an analysis module to detect contact information within the audio content. The system may also include a memory to store a record of the contact information.

In a particular embodiment, a system to identify contact information may include an input to receive a data stream including video content. The system may also include an analysis module to analyze a plurality of frames of the video content to identify contact information depicted within at least one of the plurality of frames. The system may also include a memory to store a record of the contact information.

In a particular embodiment, a method of identifying contact information may include receiving a data stream. The data stream may include audio content that includes contact information. The method may include analyzing the data stream to identify the contact information. The method may also include storing a record of the contact information.

In a particular embodiment, a method of identifying contact information may include receiving a data stream. The data stream may include video content. Contact information may be depicted within the video content. The method may also include analyzing a plurality of frames of the video content to identify the contact information within at least one of the plurality of frames. The method may also include storing a record of the contact information.

In a particular embodiment, a computer readable medium may include computer readable instructions executable by a processor to receive a data stream. The data stream may include audio content that includes contact information. The instructions may also be executable by the processor to analyze the data stream to identify the contact information. The instructions may also be executable by the processor to store a record of the contact information.

In a particular embodiment, a computer readable medium may include computer readable instructions executable by a processor to receive a data stream having video content. In a particular embodiment, contact information may be depicted within the video content. The instructions may be executable to analyze a plurality of frames of the video content to identify the contact information within at least one of the plurality of frames. The instructions may also be executable to store a record of the contact information.

Figure 1:
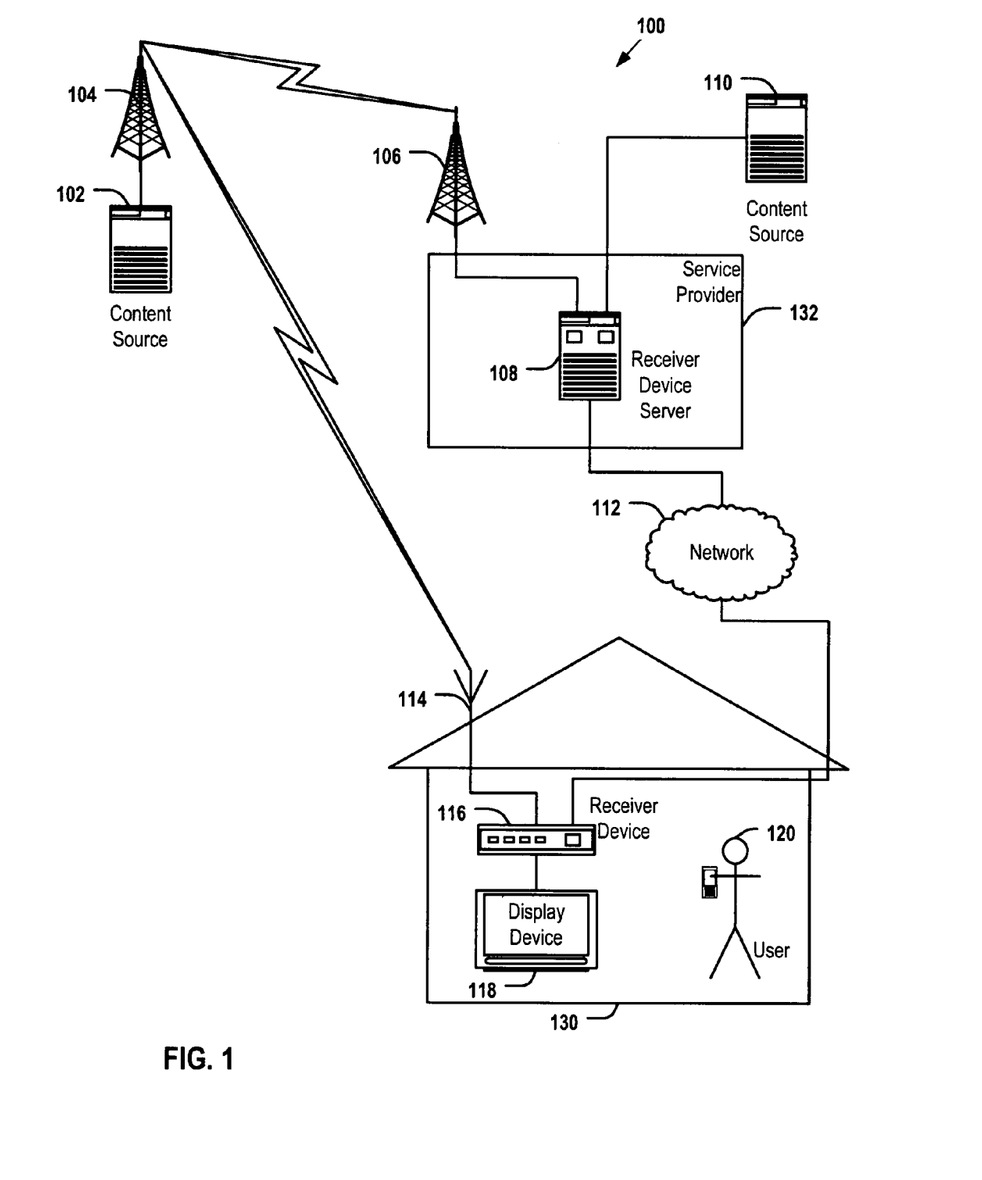
FIG. 1 is a block diagram of a first particular embodiment of a system to identify contact information.

FIG. 1 is a block diagram of a first particular embodiment of a system to identify contact information, generally designated 100. The system 100 includes at least one content source, such as a first content source 102 and a second content source 110. The system 100 also includes at least one receiver device, such as receiver device 116 and receiver device server 108. In an illustrative embodiment, the content sources 102, 110 may include a source of audio content, a source of video content, or of any combination thereof. For example, the content sources 102, 110 may include a source of television content, a source of movie content, a source of advertising content, a source of radio content, any other source of audio or video content, or any combination thereof. In a particular illustrative embodiment, the receiver device 116, 108 may include a device capable of receiving, and utilizing the content provided by the content sources 102, 110. For example the receiver device may include a set-top box device, a radio or television receiver, any other receiving device, or any combination thereof.

In a particular embodiment, the first content source 102 may send content via a broadcast signal from a transmission tower 104. In a particular illustrative embodiment, the signal may be received via an antenna 114 at a user residence 130. The content may be provided to the receiver device 116 to be processed and to be sent to a display device 118. In another particular illustrative embodiment, the content may be received by a service provider 132 at another tower 106. The service provider 132 may send the content to the receiver device server 108 to be processed. The receiver device server 108 may process the content and send the content via a network 112 to the user residence 130. In another particular embodiment, the second content source 110 may provide content to the receiver device server 108 directly or via a network.

In a particular embodiment, the receiver device 116 may process content received from the content sources 102, 110 to detect contact information within the content. In a particular embodiment, the receiver device 116 may analyze the content to identify contact information. For example, when the content includes audio content, the receiver device 116 may process the audio content to identify the contact information. In another example, when the content includes video content, such as a television advertisement, a television program, an advertising program or "infomercial," movie content, or other video content. The receiver device 116 may process a plurality of frames of the video content to identify contact information. In a particular embodiment, a record of identified contact information may be stored at the receiver device 116. In a particular embodiment, the receiver device 116 may generate a user interface display including the contact information. The user interface display may be presented to a user 120 at the display device 118. The user interface display may allow the user 120 to initiate a communication based on the contact information.

In a particular embodiment, the receiver device server 108 may process content received from the content sources 102, 110 to detect contact information within the content. In a particular embodiment, the receiver device server 108 may analyze the content to identify contact information. For example, when the content includes audio content, the receiver device server 108 may process the audio content to identify the contact information. In another example, when the content includes video content, the receiver device server 108 may process a plurality of frames of the video content to identify contact information. In a particular embodiment, a record of identified contact information may be stored at the receiver device server 108. In another particular embodiment, a record of the identified contact information may be sent to a receiver device 116 at the user residence 130. In a particular embodiment, the receiver device server 108 may generate a user interface display including the contact information. The user interface display may be presented to the user 120 at the display device 118 via the receiver device 116. The user interface display may allow the user 120 to initiate a communication based on the contact information.

Figure 2:
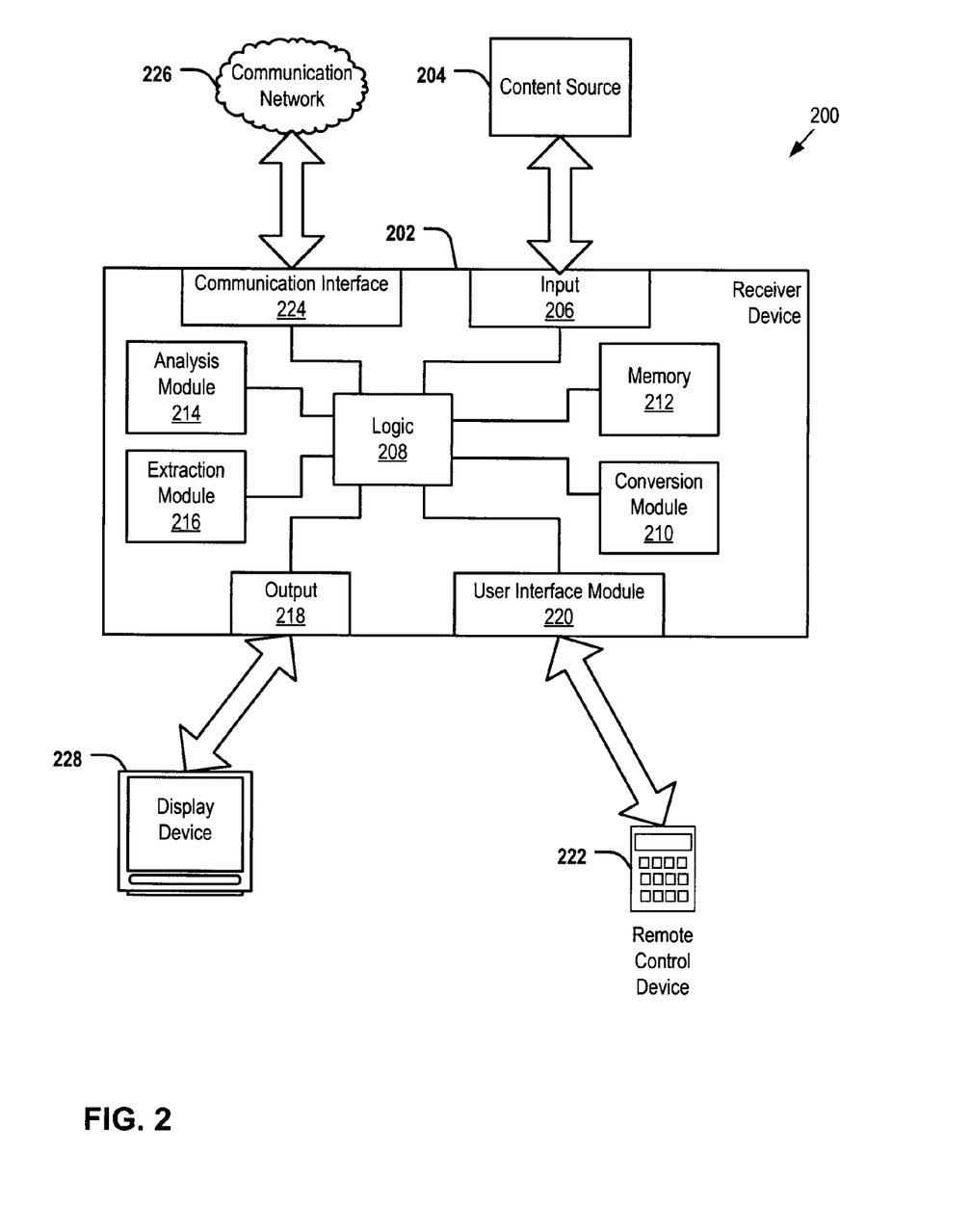
FIG. 2 is a block diagram of a second particular embodiment of a system to identify contact information.

FIG. 2 is a block diagram of a second particular embodiment of a system to identify contact information, generally designated 200. The system 200 includes a content source 204 in communication with a receiver device 202. The receiver device 202 may communicate with a display device 228. Further, the receiver device 202 may be in communication with a communications network 226. The system 200 may include a remote control device 222 for communicating user input to the receiver device 202. In a particular embodiment, the receiver device 202 may include an input 206, logic 208, a conversion module 210, a memory 212, an analysis module 214, an extraction module 216, an output 218, a user interface module 220 and a communication interface 224.

In a particular embodiment, the receiver device 202 may receive a data stream from the content source 204 via the input 206. The data stream may include audio content, video content, other data associated with audio content or video content, or any combination thereof. The content may include contact information. In an illustrative embodiment, when the data stream includes audio content, the contact information may be embedded within the audio content, e.g., in spoken words. In another illustrative embodiment, when the data stream includes video content, the contact information may be depicted within one or more frames of the video content.

The input 206 may send the data stream to logic 208 where it is processed. In a particular embodiment, when the data stream includes audio content, the logic 208 may invoke the conversion module 210 to generate a text representation of the audio content. For example, the conversion module 210 may generate the text representation of the audio content using an automated speech recognition process. In another particular embodiment, when the data stream includes video content, the logic 208 may invoke the conversion module 210 to generate a text representation of images within the video content. For example, the conversion module 210 may generate the text representation using an automated character recognition process to identify text within the video content. The conversion module 210 may be implemented using hardware, software instructions executable by the logic 208, or any combination thereof.

In a particular embodiment, the logic 208 may invoke the analysis module 214 to identify contact information within the content. In an illustrative embodiment, the analysis module 214 may perform automated pattern recognition to identify the contact information. For example, the analysis module 214 may use automated pattern recognition (such as, named entity detection, regular expression matching, etc.) to search for contact information within a text representation of audio content (such as a closed-captioning data stream associated with video content, a teletext data stream associated with video content, or subtitles associated with video content), within a textual representation of video content, within the audio content, within the video content (e.g., text represented within at least one frame of the video content), or any combination thereof. In an illustrative embodiment, when the data stream includes video content, the analysis module 214 may analyze a plurality of frames of the video content to identify contact information depicted within at least one of the frames. For example, the analysis module 214 may perform automated pattern recognition (such as, optical character recognition) to identify the contact information depicted within at least one frame of the video content. The analysis module 214 may be implemented using hardware, software instructions executable by the logic 208, or any combination thereof.

In a particular illustrative embodiment, the logic 208 may invoke the extraction module 216 to extract the contact information from the content and to generate a record of the contact information. The record of the contact information may be stored in the memory 212. The extraction module 216 may be implemented using hardware, software instructions executable by the logic 208, or any combination thereof.

In a particular embodiment, the receiver device 202 may send a user interface display including the contact information to the display device 228 via the output 218. Examples of such user interfaces are illustrated in FIGS. 5, 6, 7, 8 and 9.

In a particular embodiment, the user may interact with the user interface via the remote control device 222. The remote control device 222 may transmit control signals to the user interface module 220. The user interface module 220 may interpret the control signals to implement user actions, such as selection of user selectable elements within the user interface. For example, the user may interact with the user interface to initiate a communication based on the contact information.

In a particular embodiment, the communication interface 224 may be adapted to initiate a communication based on the contact information. For example, the communication interface 224 may initiate a communication in response to user input received via the user interface. Initiating a communication may include, for example, transmitting an electronic mail (e-mail) message, requesting a web page, dialing a telephone number, initiating a Voice over Internet Protocol (VoIP) communication, initiating another form of communication, or any combination thereof.

In a particular embodiment, the output 218 may generate a user interface including historical contact information based on contact information records stored in the memory 212. In a particular illustrative embodiment, a portion of the content may be stored in the memory 212 and associated with the contact information. For example, where the content includes video content, at least one frame of the video content may be stored in association with the contact information. In another example, where the content includes audio content, an audio clip of the content may be stored in association with the contact information. In a particular embodiment, the user interface may include contact information from a plurality of contact information records. The user interface may allow the user to select contact information from at least one of the contact information records and to initiate a communication based on the contact information.

Figure 3:
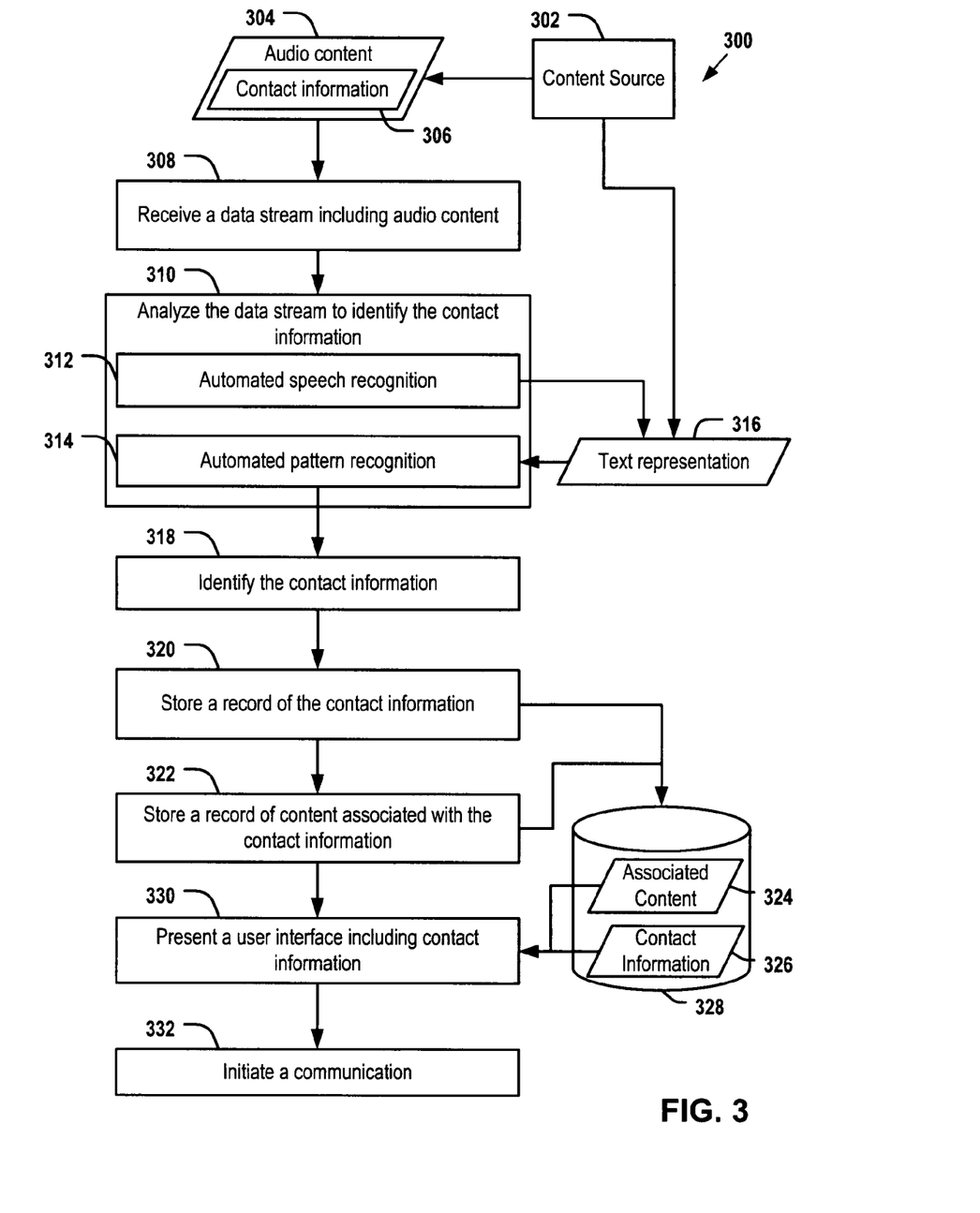
FIG. 3 is a flow chart of a first particular embodiment of a method of identifying contact information.

FIG. 3 is a flow chart of a first particular embodiment of a method of identifying contact information, generally designated 300. The method 300 includes, at 308, receiving a data stream including audio content 304 from a content source 302. The audio content 304 includes contact information 306. For example, the audio content 304 may include radio content, digital audio content (such as, streaming media content, downloaded media content, or digital broadcast media content), an audio portion of television content, other audio content, or any combination thereof. The contact information 306 may include, for example, a telephone number; a network address, such as an e-mail address, a Session Initiation Protocol (SIP) address, or a universal resource locator (URL); a street address; a postal address; any other contact information; or any combination thereof. In a particular embodiment, contact information 306 may include any information that enables initiating a communication of any kind.

The method 300 also includes, at 310, analyzing the data stream to identify the contact information 306. In a particular illustrative embodiment, the contact information 306 may be embedded within the audio content 304. For example, the contact information 306 may be present as spoken words within the audio content 304. In another particular illustrative embodiment, a text representation 316 of the audio content 304 may be provided by a content source 302. For example, the text representation 316 may include closed captioning data sent with the audio content 304 from the content source 302. In a particular embodiment, analyzing the data stream may include, at 312, performing automated speech recognition on the audio content 304 to generate the text representation 316 of the audio content 304. In a particular illustrative embodiment, analyzing the data stream 310 may include, at 314, performing automated pattern recognition. For example, the automated pattern recognition may be performed with respect to the audio content 304 or the text representation 316 of the audio content.

In a particular embodiment, the method 300 may also include, at 320, storing a record 326 of the contact information 306 in a memory 328 after identifying the contact information, at 318. In a particular illustrative embodiment, the method 300 may include, at 322, storing a record 324 of content associated with the contact information 306 in the memory 328. For example, the content associated with the contact information 306 may include a sound clip of the audio content 304, a video clip or video still image associated with the audio content 304, any other content associated with the contact information 306, or any combination thereof.

In a particular embodiment, the method 300 may include, at 330, presenting a user interface including contact information from the contact information record 326. The user interface may include user selectable elements which allow the user to initiate a communication based on the contact information.

In a particular embodiment, the method 300 may include, at 334, presenting a user interface including additional information 338 related to the contact information. The additional information 338 may include any information related to the contact information or an entity (such as a person, company, network device, etc.) associated with the contact information. For example, the additional information 338 may include a map showing a location of a person whose address is included in the contact information. In an illustrative embodiment, the information database 340 may include a third-party data store. For example, the information database 340 may include an Internet search engine. The user interface may include user selectable elements which allow the user to access further additional information related to the contact information.

In a particular illustrative embodiment, the method 300 may also include, at 332, initiating a communication based on the contact information in response to user input indicating a request to initiate the communication.

Figure 4:
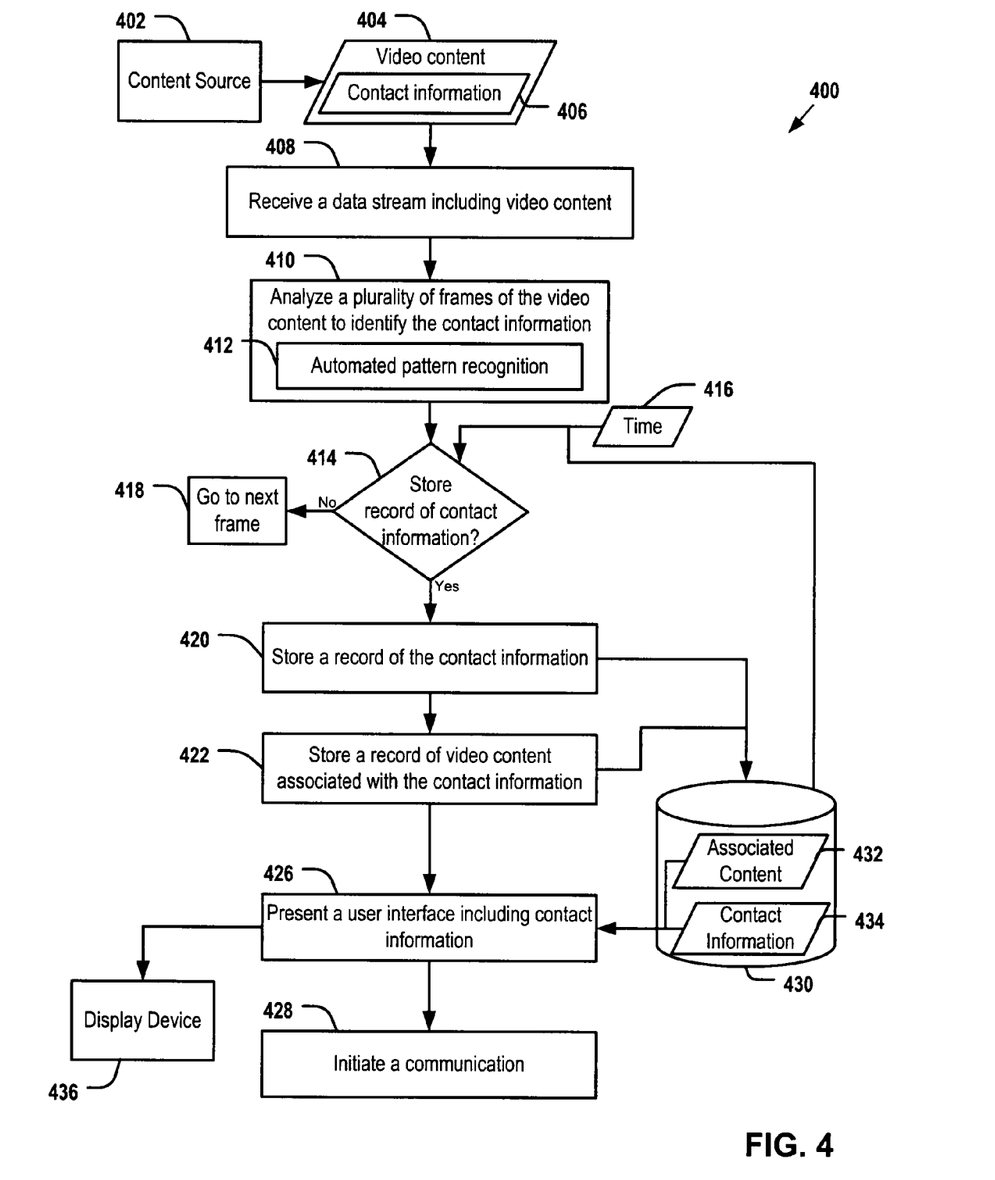
FIG. 4 is a flow chart of a second particular embodiment of a method of identifying contact information.

FIG. 4 is a flow chart of a second particular embodiment of a method of identifying contact information, generally designated 400. The method 400 includes, at 408, receiving a data stream including video content 404 from a content source 402. The video content 404 includes contact information 406. In a particular embodiment, the contact information 406 is depicted within the video content 404. For example, the contact information 406 may be depicted within one or more frames of the video content 404.

The method 400 also includes, at 410, analyzing a plurality of frames of the video content 404 to identify the contact information 406. In a particular illustrative embodiment, analyzing a plurality of frames of the video content 404 may include analyzing every frame of the video content, analyzing frames at selected intervals of the video content, analyzing selected frames of the video content, or any combination thereof. Additionally, analyzing a plurality of frames of the video content 404 may include analyzing an entire frame of the video content, i.e., an entire still image of the video content; analyzing a portion of each frame of the video content, e.g., a top portion of the image, a bottom portion of the image, a central portion of the image, a text overlay on the image, etc.; or any combination thereof. For example, analyzing the plurality of frames may include analyzing crawling text at the bottom of the video content 404 to identify the contact information 406. In a particular illustrative embodiment, analyzing a plurality of frames of the video content 404 may include, at 412, performing automated pattern recognition, such as optical character recognition, on one or more of the video frames. The automated pattern recognition may be used to identify the contact information 406 within one or more of the plurality of frames.

In a particular embodiment, the contact information 406 may be included in more than one frame of the video content 404. To avoid storing a plurality of records of the same contact information, the method 400 may include, at 414, determining whether to store a record of the contact information 406. In a particular embodiment, the determination of whether to store a record of the contact information 406 may be based on whether a record of the particular contact information already exists, how old an existing record of the contact information is, whether the contact information has been identified in consecutive or nearby frames of the video content, any other information about the video content 404 or the contact information 406, or any combination thereof. To illustrate, if a record of the contact information 406 already exists, determining whether to store a new record of the contact information 406 may include determining whether a threshold amount of time 416 has passed since the existing record of the contact information 406 was stored. If more than the threshold amount of time 416 has passed, a determination may be made, at 414, to store a new record of the contact information 406. If a determination is made, at 414, not to store a record of the contact information 406, the method 400 may include, at 418, proceeding to a next frame to be analyzed. If a record of the contact information is to be stored, the method may include, at 420, storing a record 434 of the contact information 406 in a memory 430. In a particular embodiment, the method 400 may also include, at 422, storing a record 432 of content associated with the contact information 406 in the memory 430. The record 432 of the content associated with the contact information 406 may include for example, an audio clip, a video clip or a video still image associated with or including the contact information 406.

In a particular embodiment, the method 400 may also include, at 424, presenting a user interface including contact information from the contact information record 434. For example, the user interface may be presented at a display device 436. The user interface may include user selectable elements by which the user may initiate a communication based on the contact information.

In a particular embodiment, the method 400 may include, at 426, presenting a user interface including additional information 438 related to the contact information. The additional information 438 may include any information related to the contact information or an entity (such as a person, company, network device, etc.) associated with the contact information. For example, the additional information 438 may include a map showing a location of a person whose address is included in the contact information. In an illustrative embodiment, the information database 440 may include a third-party data store. For example, the information database 440 may include an Internet search engine. The user interface may include user selectable elements which allow the user to access further additional information related to the contact information.

In a particular embodiment, the method 400 may also include, at 428, initiating a communication based on the contact information in response to user input indicating a request to initiate the communication.

Figure 5:
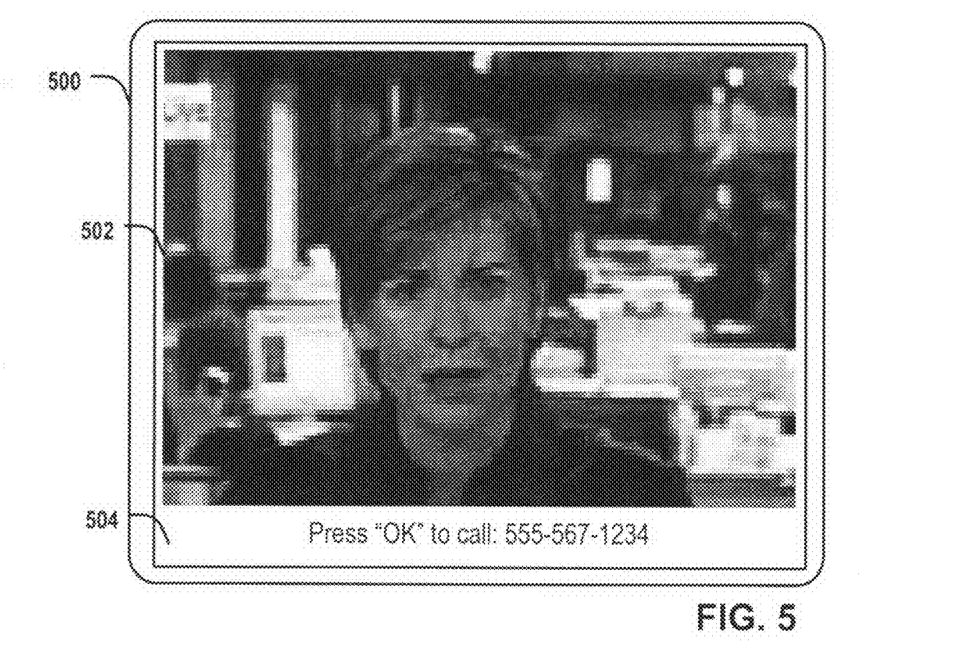
FIG. 5 is a diagram of a first particular embodiment of a user interface to display contact information.

FIG. 5 is a diagram of a first particular embodiment of a user interface to display contact information, generally designated 500. The user interface 500 includes a content display area 502 to present content. The user interface 500 also includes a contact information area 504 to present contact information associated with the content. In the particular embodiment depicted in FIG. 5, the contact information is included in words spoken by a speaker. The contact information has been identified in the content, and is displayed as contact text within the contact information area 504. In an illustrative embodiment, the user may interact with the user interface 500 to initiate a communication based on the contact information. For example, the user may select an "OK" button on a remote control device to initiate a call to the telephone number "555-567-1243."

Figure 6:
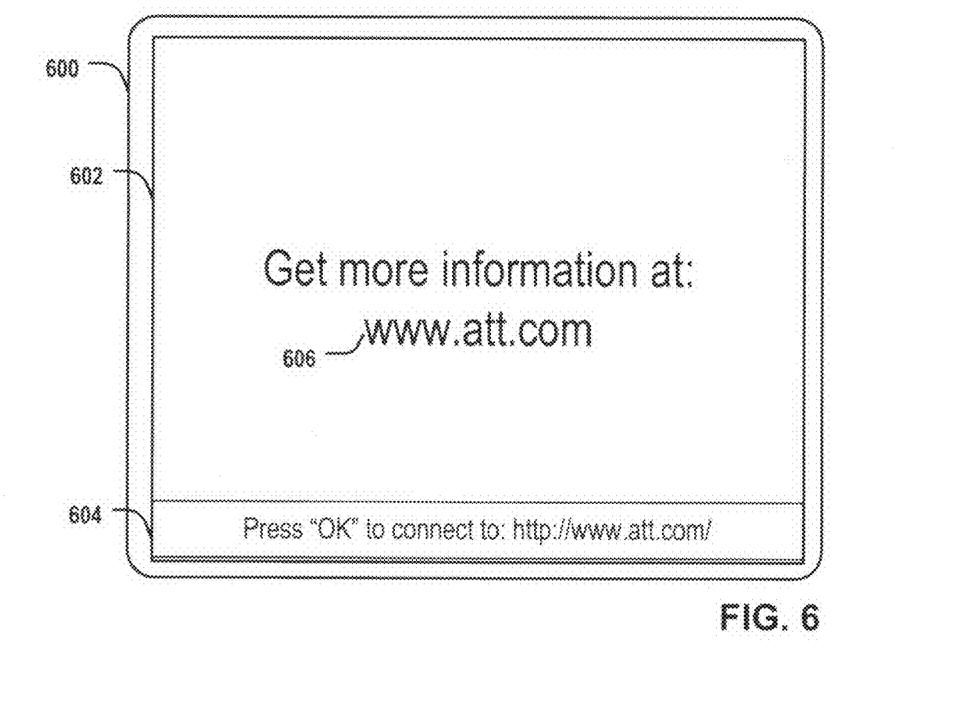
FIG. 6 is a diagram of a second particular embodiment of a user interface to display contact information.

FIG. 6 is a diagram of a second particular embodiment of a user interface to display contact information, generally designated 600. The user interface 600 includes a content display area 602 to present video content. The user interface 600 also includes a contact information area 604 to present contact information. In the particular embodiment depicted in FIG. 6, at least one frame of video content in the content area 602 includes a network address 606, such as a Universal Resource Locator (URL). The contact information is displayed as contact text within the contact information area 604. In an illustrative embodiment, the user may interact with the user interface 600 to initiate a communication based on the contact information. For example, the user may select an "OK" button on a remote control device to connect to the network address "www.att.com."

Figure 7:
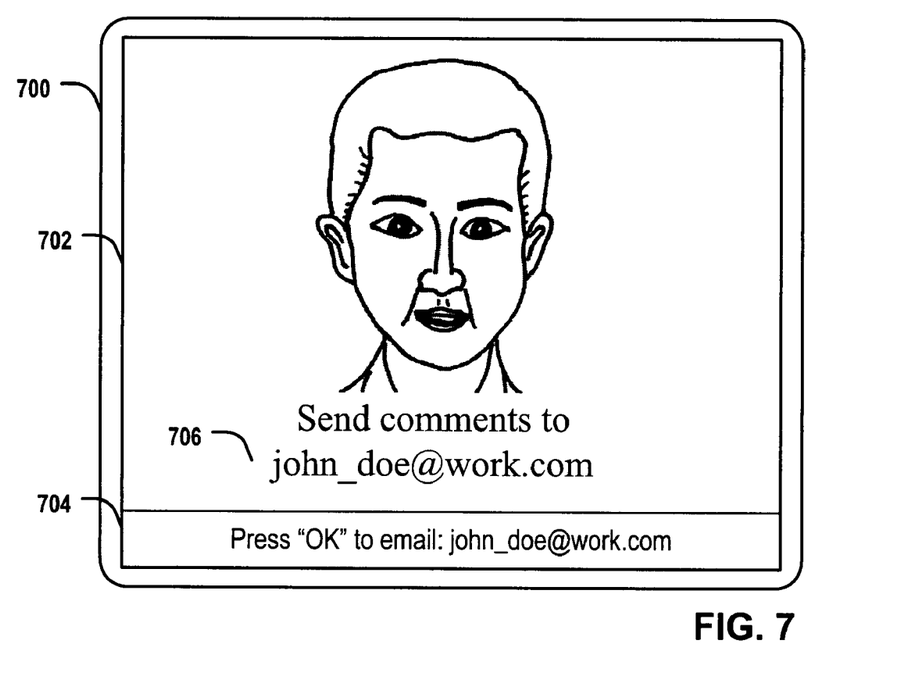
FIG. 7 is a diagram of a third particular embodiment of a user interface to display contact information.

FIG. 7 is a diagram of a third particular embodiment of a user interface to display contact information, generally designated 700. The user interface 700 includes a content display area 702 to present video content. The user interface 700 also includes a contact information area 704 to present contact information. In the particular embodiment depicted in FIG. 7, at least one frame of video content in the content area 702 includes an e-mail address 706. The contact information is displayed as contact text within the contact information area 704. In an illustrative embodiment, the user may interact with the user interface 700 to initiate a communication based on the contact information. For example, the user may select an "OK" button on a remote control device to initiate an e-mail to the e-mail address "john_doe@work.com."

Figure 8:
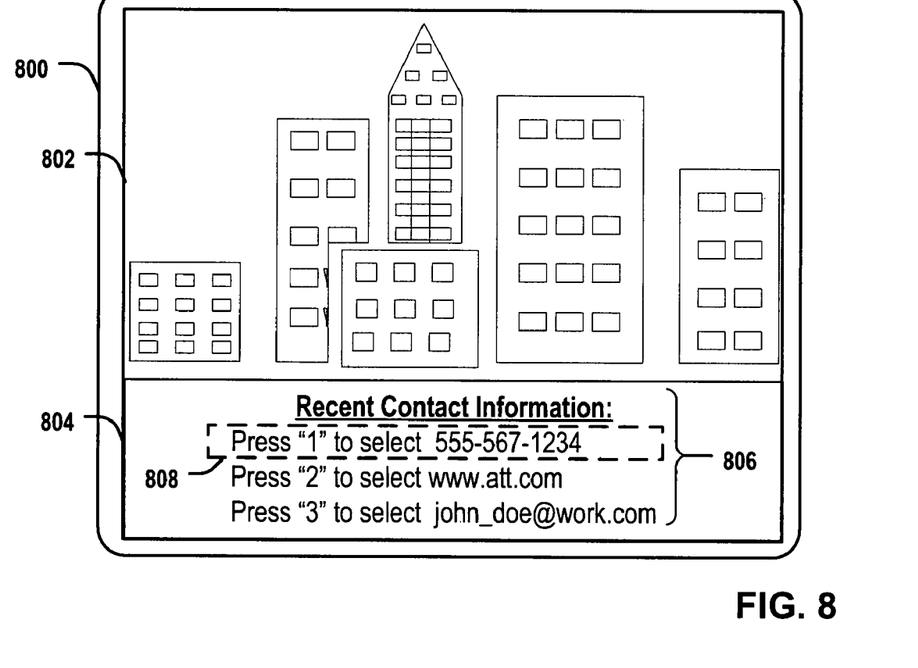
FIG. 8 is a diagram of a fourth particular embodiment of a user interface to display contact information.

FIG. 8 is a diagram of a fourth particular embodiment of a user interface to display contact information, generally designated 800. The user interface 800 includes a content area 802 and a contact information area 804. The contact information area 804 includes a list of historical contact information 806, such as contact information saved from other content and associated with a user. In a particular embodiment, the content area 802 may include live content, such as a live television broadcast, or other content. In another particular embodiment, the content area 802 may include content associated with selected contact information. For example, the content area 802 may display one or more still images, one or more video clips, one or more audio clips associated with selected contact information 808.

Figure 9:
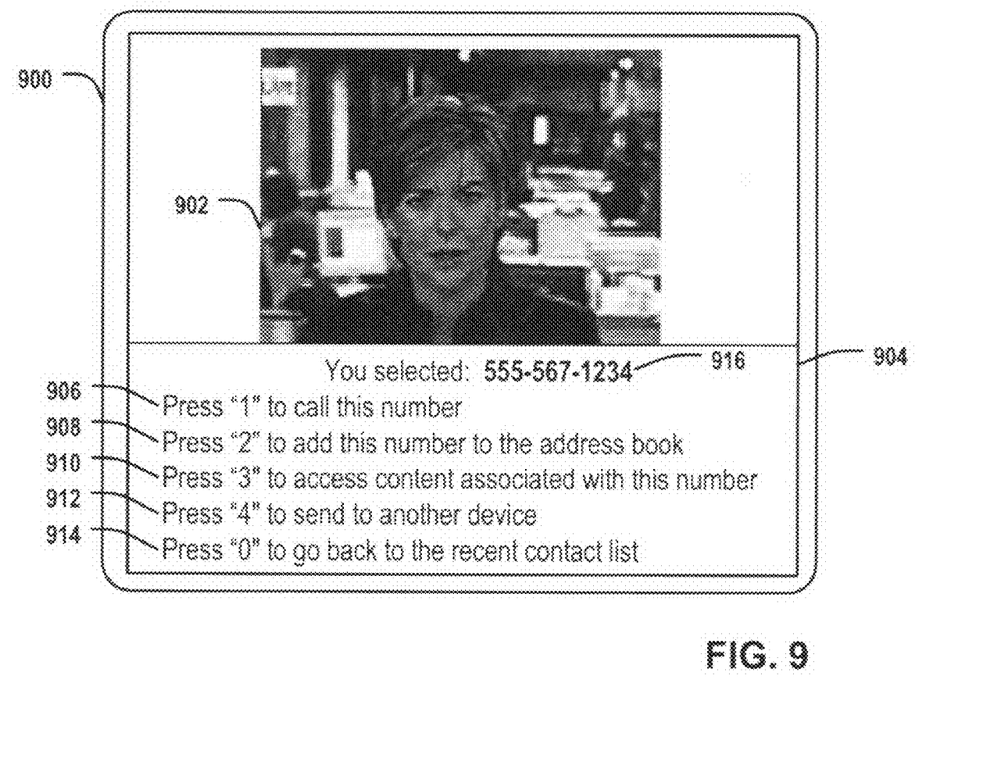
FIG. 9 is a diagram of a fifth particular embodiment of a user interface to display contact information.

FIG. 9 is a diagram of a fifth particular embodiment of a user interface to display contact information, generally designated 900. The user interface 900 includes a content area 902 and a contact information area 904. The user interface 900 may be presented in response to user selection of particular contact information from a list of historical contact information, such as the selected contact information 808 from the list of historical contact information 806 depicted in FIG. 8. In the particular embodiment depicted in FIG. 9, the user has selected contact information including the telephone number "555-567-1243."

The user interface 900 may display the selected contact information 916 from a contact information record. The user interface 900 may also display content associated with the selected contact information 916 in content area 902. For example, the content area 902 may display a video and audio clip of a speaker speaking the contact information 916.

In a particular embodiment, the user interface display 900 may include a plurality of user interface selections. For example, the user interface selections may include a user selectable element 906 to initiate a communication based on the contact information 916. In another particular illustrative embodiment, the user interface selections may include a user selectable element 908 to add the contact information 916 to an address book. In another particular illustrative embodiment, the user interface selections may include a user selectable element 910 to access content associated with the contact information 916. For example, by user selectable element 910, an audio clip, video clip or still image associated with the contact information 916 may be presented to the user in content area 902. In a particular illustrative embodiment, the user interface selections may include a user selectable element 912 to send the contact information 916 to another device. For example, by user selectable element 912, the telephone number 555-567-1243 may be sent via a local area network to a communication device associated with the user. In another particular illustrative embodiment, the user selectable options may include a user selectable element 914 to return to a recent contact list to display other historical contact information records.

In conjunction with the configuration of structure described herein, the systems and methods disclosed identify contact information. In a particular illustrative embodiment, a data stream including content and contact information may be received at a receiver device. The receiver device may analyze the data stream to identify the contact information. The receiver device may also store a record of the contact information.

Figure 10:
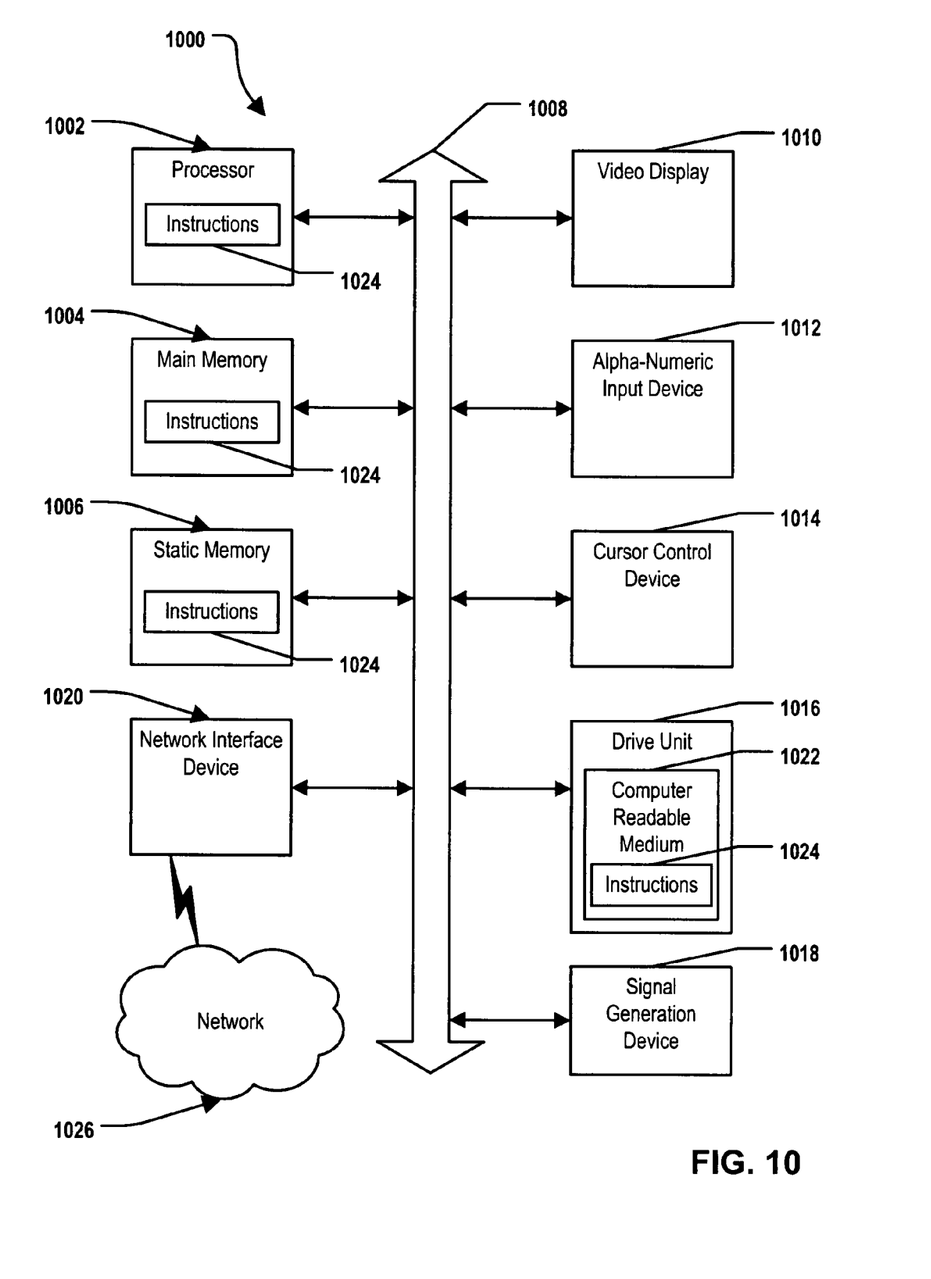
FIG. 10 is a block diagram of an illustrative embodiment of a computer system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. In an illustrative embodiment, the computer system 1000 may include any one or more of the content sources, receiver devices, display devices or elements of the networks depicted in FIGS. 1, 2, 3 and 4.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g., software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a receiver device, a data stream comprising video content that includes a plurality of video frames, wherein contact information is depicted in at least one video frame of the plurality of video frames;
   analyzing the at least one video frame to identify the contact information; and
   in response to determining that the contact information was not previously stored, storing a record of the contact information at a memory that is accessible to the receiver device, wherein the record of the contact information comprises a record of the at least one frame of the video content associated with the contact information.

2. The method of claim 1, wherein analyzing the at least one video frame comprises performing automated pattern recognition on the at least one video frame to identify the contact information.

3. The method of claim 1, wherein the method further comprises determining when the contact information was last identified in the video content before storing the record.

4. The method of claim 1, further comprising presenting a user interface to enable a user to initiate a communication based on the contact information.

5. The method of claim 1, further comprising presenting a user interface including information regarding at least one historical contact information record.

6. The method of claim 1, further comprising presenting a user interface including the contact information and the at least one frame of the video content associated with the contact information.

7. A receiver device comprising:
   a processor;
   a memory accessible to the processor, the memory including operational instructions that are executable by the processor;
   an input to receive a data stream including video content;
   an analysis module that is executable by the processor to:
      analyze a plurality of frames of the video content to identify contact information depicted within at least one of the plurality of frames; and
   a user interface module that is executable by the processor to generate a user interface display including the contact information,
   wherein the operational instructions are executable by the processor to store a record of the contact information in the memory, wherein the record of the contact information comprises a record of the at least one frame of the video content associated with the contact information.

8. The receiver device of claim 7, further comprising a communication interface responsive to the user interface module to initiate a communication based on the contact information in response to user input via the user interface display.

9. The receiver device of claim 7, wherein the data stream further comprises audio content associated with the video content, and wherein the analysis module analyzes the audio content to detect contact information within the audio content.

10. A tangible non-transitory computer readable medium comprising computer readable instructions, wherein the computer readable instructions are executable by a processor to:
   receive a data stream comprising video content, wherein contact information is depicted within the video content;
   analyze a plurality of frames of the video content to identify the contact information within at least one of the plurality of frames;
   provide a user interface display to enable a user to initiate a communication based on the contact information; and
   store a record of the contact information, wherein the record of the contact information comprises a record of the at least one frame of the video content associated with the contact information.

11. The tangible non-transitory computer readable medium of claim 10, wherein the contact information includes at least one of a network address, a mail address, and a telephone number.

12. The tangible non-transitory computer readable medium of claim 10, wherein the computer readable instructions are further executable by the processor to present a user interface including the contact information.

13. The tangible non-transitory computer readable medium of claim 10, wherein the computer readable instructions are further executable by the processor to store a record of at least one frame of the video data associated with the contact information.

\* \* \* \* \*